United States Patent [19]

Bowytz

[11] Patent Number: 4,605,577
[45] Date of Patent: Aug. 12, 1986

[54] DOUBLE-FACED ADHESIVE TAPE SECURING SYSTEM AND METHOD OF USING SAME

[76] Inventor: Steven H. Bowytz, 146 Slater Dr., Pittsburgh, Pa. 15236

[21] Appl. No.: 713,614

[22] Filed: Mar. 19, 1985

[51] Int. Cl.$^4$ ............... B32B 7/06; B32B 7/10; B32B 31/04
[52] U.S. Cl. ................... 428/40; 428/124; 428/130; 156/313; 156/344; 206/555; 206/484; 206/813
[58] Field of Search ............ 428/40, 124, 130; 206/813, 484, 449, 555, 460, 820; 427/208; 156/344, 289, 313

[56] References Cited

U.S. PATENT DOCUMENTS 4,420,519 12/1983 Slemmons ............... 428/40

Primary Examiner—Alexander S. Thomas
Attorney, Agent, or Firm—Wigman & Cohen

[57] ABSTRACT

The present invention relates to a system for packaging and a method of using double-faced adhesive tape. A strip of waxed or otherwise non-stick material is folded to form a pocket in which a piece of double-faced tape having a hold tab at one end thereof is inserted such that the hold tab projects from without the pocket. To apply the tape, the wrapper and projecting hold tab are positioned between two pieces of material that are intended to be taped together. A pull tab, which is connected to the wrapper, extends out from between the two pieces of material. Pressure is then applied to the material surrounding the hold tab in order to retain the hold tab in position, and the pull tab is pulled away from the hold tab and tape. As a result, the non-stick wrapper is removed from the tape, leaving the double-faced tape and the attached hold tab in position between the two materials that are being taped together.

12 Claims, 12 Drawing Figures

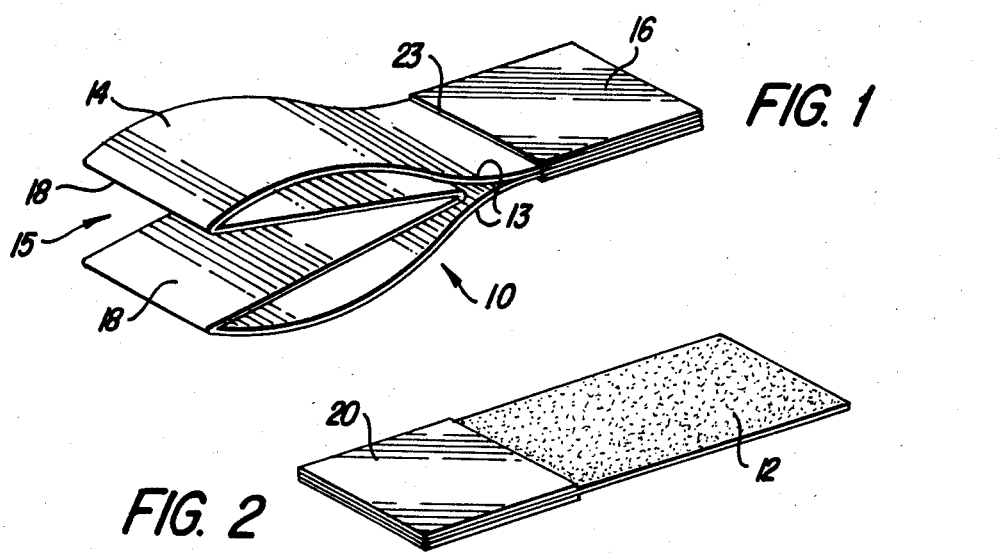
FIG. 1
FIG. 2
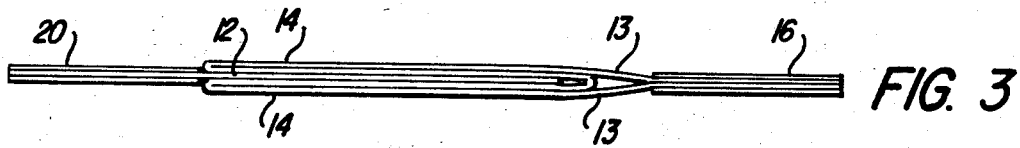
FIG. 3
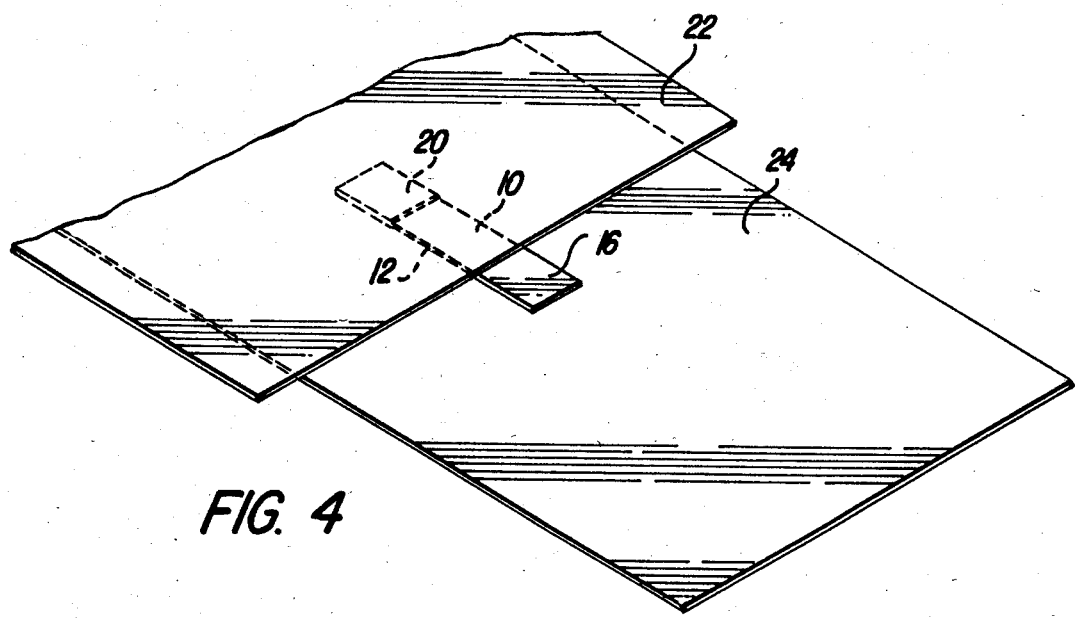
FIG. 4

DOUBLE-FACED ADHESIVE TAPE SECURING SYSTEM AND METHOD OF USING SAME

BACKGROUND OF THE INVENTION

The present invention relates to a system for packaging and a method of using double-faced adhesive tape, and in particular to a system for packaging pre-cut lengths of double-faced adhesive tape and a method of applying the tape.

The use of double-faced adhesive tape, i.e., tape having an adhesive coating on both sides thereof, is well known in the art and has been found convenient for adhesively securing two flat surfaces together.

Double-faced adhesive tape is generally packaged and marketed in rolls of convenient widths. Usually, the tape is merely rolled onto itself with a liner interposed between the layers of tape or on both sides of the tape to prevent the tape from sticking to itself. To use a roll of double-faced adhesive tape, a convenient length of tape is unrolled, cut from the roll, the liner removed and the tape is applied in a conventional manner between two surfaces.

Conventional systems for packaging and using double-faced adhesive tape on rolls present several problems. If the liner has been removed, as frequently occurs, the outermost layer of tape on the roll has an exposed adhesive surface. Lint and dirt collect on the exposed surface, thus destroying its usefulness. Therefore, the outermost layer frequently must be cut from the roll and discarded before using the roll of tape.

Another problem resulting from rolled double-faced adhesive tape is that it is difficult to apply. After it is unrolled and cut, the loose piece of tape tends to cling to anything, including itself and the user's fingers. As a result, before the tape can be properly applied, it frequently folds back on itself or sticks to the user's fingers, thus reducing or destroying the tape's adhesiveness, and thus the usefulness of the tape. Furthermore, because of the tacky nature of double-faced adhesive tape, it is frequently difficult to cut the tape into useful lengths.

If, as mentioned above, the tape has a liner on one or both sides thereof, the above problems are possibly mitigated, but clearly not avoided. At some point in the process of applying the tape, the liner(s) will have to be removed, thus presenting the user with the challenge of applying the tape without having it stick to itself or the user's fingers.

A search of the prior art uncovered several prior art references that disclose solutions for certain problems associated with double-faced adhesive tape, but no prior art reference located disclosed the novel and versatile solution of the present invention.

U.S. Pat. No. 4,420,519 discloses a napkin retainer comprising a piece of double-faced adhesive tape having liners covering both surfaces of the tape. To use the napkin retainer, the liners are peeled off the tape, which is then used to adhere a napkin to a user's lap to prevent the napkin from falling off.

U.S. Pat. No. 2,902,734 discloses a napkin fastening means comprising a piece of tape having adhesive on one side thereof, which is folded over onto itself. A tab is located on each end thereof. To use the tape, the two tabs are pulled apart, thus exposing the adhesive surface which is used to adhere a napkin to a user's lap.

U.S. Pat. No. 4,248,919 discloses a business form having a carbon sheet and a liner interposed between a document and a cover sheet. The cover sheet has an adhesive surface on one side thereof and can be adhered to the document by pulling the liner and carbon paper from between the cover sheet and the document.

U.S. Pat. No. 882,452 discloses a tag having an adhesive on both surfaces thereof and a label extending from one end thereof.

None of the aforesaid prior art discloses a convenient or versatile solution for the problems associated with the use of double-faced adhesive tape. Specifically, none of the solutions provide a convenient means for handling the tape so that (1) it stays clean when not in use and (2) it is not likely to fold over and stick to itself when being applied.

OBJECTS AND SUMMARY OF THE INVENTION

In view of the foregoing limitations and shortcomings of the prior art devices, as well as other disadvantages not specifically mentioned above, it should be apparent that there still exists a need in the art for a convenient system for packaging and using double-faced adhesive tape and a method for applying the tape. It is, therefore, a primary object of this invention to fulfill that need by providing such a system and method.

More particularly, it is an object of this invention to provide a convenient, uniquely removable wrapper for pre-cut lengths of double-faced adhesive tape which protects the adhesive surfaces of the tape until application of the tape.

It is another object of this invention to provide a removable wrapper for pre-cut lengths of double-faced adhesive tape that is constructed to facilitate the application of the tape between two surfaces.

It is yet another object of the present invention to provide means for conveniently removing the protective wrapper from double-faced adhesive tape simultaneously with the application of the tape between two surfaces.

It is still another object of the present invention to provide a removable wrapper for a pre-cut length of double-faced adhesive tape that enables the tape to be positioned between the materials to be taped together with the wrapper in place, and then permits the wrapper to be removed while the tape remains in position adhesively securing the materials together.

Yet another object of the present invention is to provide a system for packaging and applying double-faced adhesive tape that prevents the tape from sticking to itself or to any other unintended surface until it is applied between the surfaces to be taped together.

It is a further object of the present invention to provide a guide for properly aligning a double-faced adhesive tape system with the surfaces to be taped before the tape is actually applied.

It is still another object of the present invention to provide a novel and advantageous method of packaging double-faced adhesive tape.

Briefly described, those and other objects of the present invention are accomplished by providing a novel, specially designed wrapper for pre-cut lengths of double-faced adhesive tape. An elongated strip of waxed or otherwise non-stick release material is folded in three transverse locations so that its profile forms a "W" shape. The two free ends of the strip are joined together and fastened to a pull tab. The resulting structure is a wrapper forming a V-shaped pocket in the center with the pull tab extending from the apex of the "V." From a practical standpoint, it is only necessary that the confronting surfaces of the V-shaped pocket have a non-stick surface.

A pre-cut length of double-faced adhesive tape is provided with a non-adhesive hold tab at one end thereof. The tape is then disposed within the wrapper pocket, i.e., sandwiched between the confronting surfaces of the "V" such that no adhesive surfaces of the tape are exposed and the non-adhesive hold tab extends from the pocket at the end of the wrapper opposite the pull tab.

According to the method of the invention for applying the tape, the wrapper and projecting hold tab are positioned between two pieces of material to be taped together, with the pull tab extending from between the two pieces of material. Pressure is then applied to the material adjacent the hold tab to retain the hold tab in position between the material, and the pull tab is pulled in a direction parallel to the length of the tape and away from the hold tab. As a result, the non-stick wrapper is pulled back upon itself and thereby removed from the tape, leaving the double-faced adhesive tape and the attached hold tab in adhesively securing relationship between the two materials that are being taped together.

Alternative embodiments include the addition of a paper guide means on the wrapper to aid in positioning the wrapper and to indicate the location of the end of the tape within the wrapper, and the attachment of a decorative tab to the end of the double-faced adhesive tape opposite the hold tab in such a way that the decorative tab extends out between the two pieces of material that are taped together.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a perspective view of the non-stick wrapper of the present invention;

FIG. 2 is a perspective view of a length of double-faced adhesive tape with a hold tab on one end thereof according to the present invention;

FIG. 3 is a side elevational view of the double-faced adhesive tape packaging system of the present invention;

FIG. 4 is a plan view of the tape packaging system of the present invention shown positioned between two pieces of paper that are to be taped together;

DETAILED DESCRIPTION OF A PREFERRED EMBODIMENT

Figure 5:
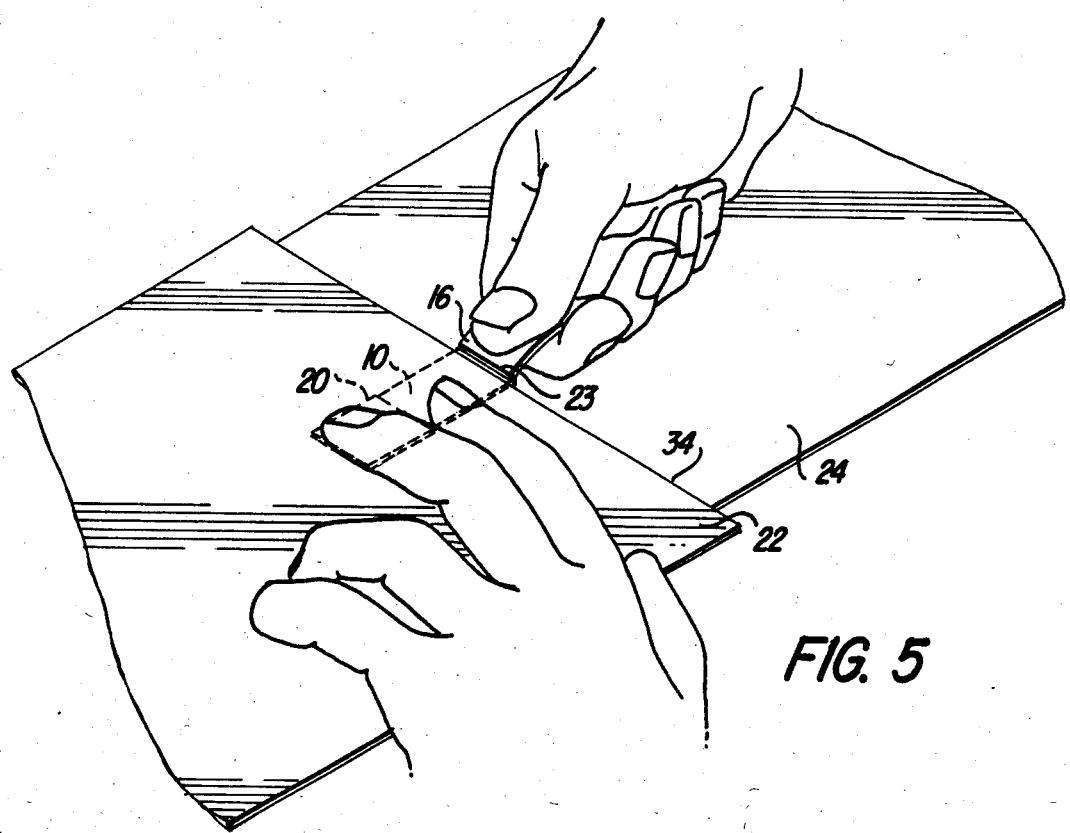
FIG. 5 is a perspective view of the tape system of the present invention shown just prior to removal of the wrapper from the tape.

Referring now in detail to the drawings wherein like parts are designated by like reference numerals throughout, there is illustrated in FIG. 1 a wrapper 10 for pre-cut lengths of double-faced adhesive tape, such as the length of tape 12 shown in FIG. 2.

The wrapper 10 comprises a strip 14 of material that is folded into a W-shaped configuration to form a V-shaped pocket 15, the free ends 13 of the strip being connected to a pull tab 16. The pull tab 16 may also be formed by securing the free ends 13 of the strip together. The folded strip 14 has two interior opposing or confronting surfaces 18, only one of which is shown in FIG. 1. Surfaces 18 have a non-stick or adhesive release finish, such as waxed paper or the like. For ease of manufacture and convenience, the entire strip 14 may have a non-stick finish, although it is only necessary that the interior surfaces 18 be so finished.

Referring now to FIGS. 2 and 3, a piece of double-faced adhesive tape 12 is illustrated therein. A hold tab 20 is affixed to one end thereof, the purpose of which will be described hereinafter. The tape 12 may be cut to any shape, length, and width desired. The piece of tape 12 is located between the interior opposing surfaces 18, and the wrapper 10 is then folded flat along the length in the tape 12 to sandwich the tape in the wrapper as shown in FIG. 3.

To use the tape system of FIG. 3, it is positioned as shown in FIG. 4 between two sheets of material 22, 24 that are intended to be taped together, with the pull tab 16 projecting from between the sheets 22, 24.

Figure 6:
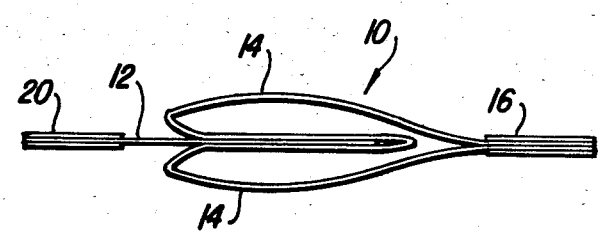
FIG. 6 is a side elevational view illustrating the wrapper being removed from the tape of the present invention.
Figure 7:
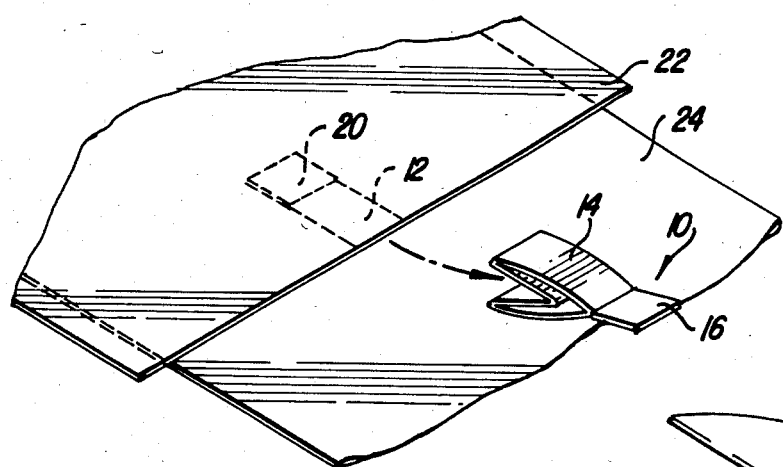
FIG. 7 is a perspective view of the tape in position with the wrapper removed.

To remove the wrapper 10 from and thus apply the tape 12, pressure is applied to the hold tab 20 through the sheets 22, 24 as seen in FIG. 5, in order to securely retain the tape 12 between the sheets 22, 24. The pull tab 16 is then drawn away from the tape 12 and hold tab 20, i.e., to the right as seen in FIG. 5. As the pull tab 16 is pulled from the tape 12, the folded strip 14 of the wrapper 10 folds back upon itself on both faces of the tape thereby exposing the tape 12, as shown in FIG. 6, until the wrapper 10 is completely removed from the tape 12, as shown in FIG. 7. The sheets of material 22, 24 are then pressed together in the area of the tape 12 to insure complete adhesion between the tape and sheets of material.

To facilitate the alignment of the top sheet 22 with the tape 12, a mark or line 23 (see FIG. 1) may be made on the pull tab 16. Thus, as shown in FIG. 5, the mark 23 is aligned with the edge of sheet 22.

Figure 8:
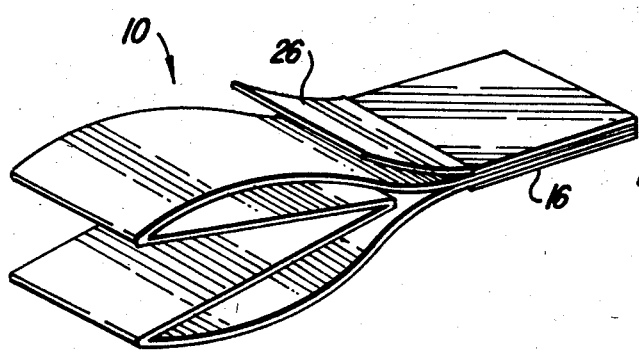
FIG. 8 is a perspective view of a first alternative embodiment of the wrapper of the present invention.
Figure 9:
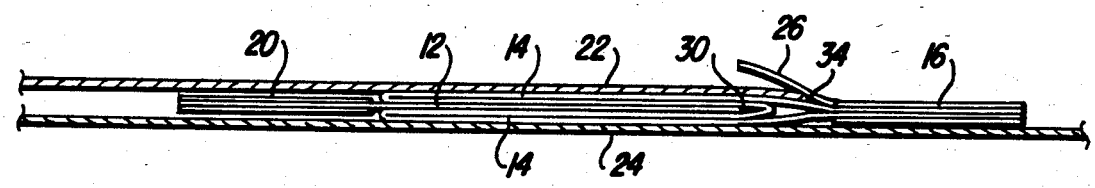
FIG. 9 is a side elevational view of the first alternative embodiment of the present invention showing the tape system in place between materials to be taped together.

An alternative embodiment of the present invention is shown in FIGS. 8 and 9 and comprises a tape system similar to that of FIG. 3 including a paper guide 26 attached to the wrapper 10 adjacent the pull tab 16 to facilitate aligning the edge 34 of the top sheet of material 22. The paper guide 26 is located so that the edge 34 of the top sheet of material 22 is stopped at the junction of the paper guide 26 and the pull tab 16 to indicate that the edge 30 of the piece of tape 12 opposite the hold tab 20 will not protrude out from under sheet 22. Therefore, by properly aligning paper guide 26 with the top sheet of material 22, one can ensure that the piece of tape 12 does not extend beyond the edge of the top sheet of material 22.

Figure 10:
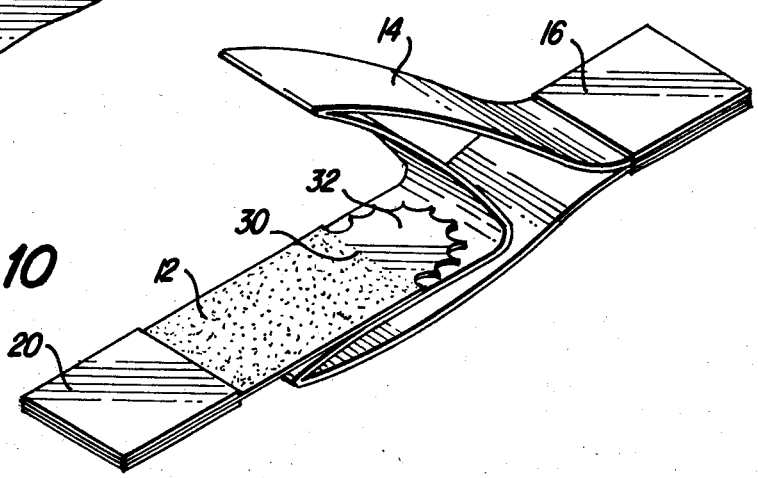
FIG. 10 is a perspective view of a second alternative embodiment of the present invention.
Figure 11:
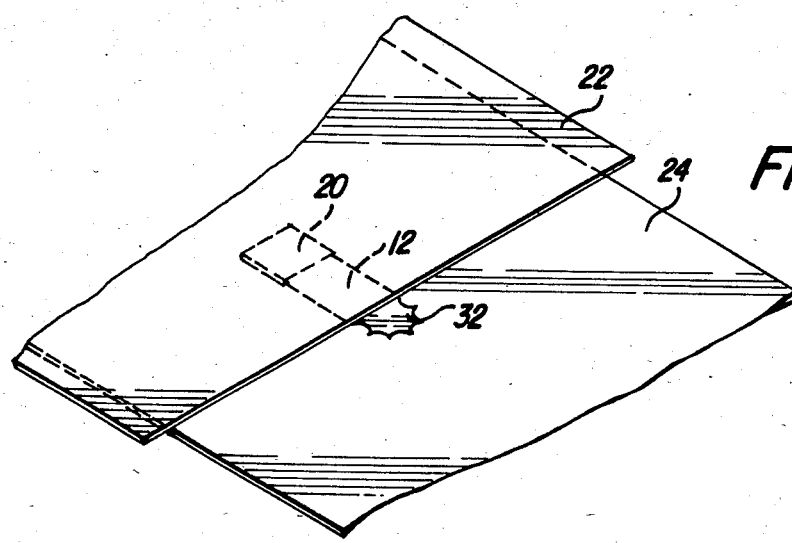
FIG. 11 is a perspective view of the second alternative embodiment of the present invention.

An additional alternative embodiment of the present invention is shown in FIGS. 10 and 11 and includes the attachment of a decorative tab 32 to the edge 30 of the piece of tape 12. Thus, when the tape 12 and tab 32 are properly positioned, as shown in FIG. 11, the decorative tab 32 protrudes from between sheets 22 and 24 and provides a decoration.

Figure 12:
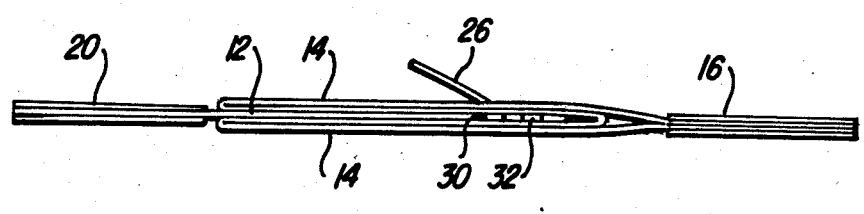
FIG. 12 is a side elevational view of a third alternative embodiment of the present invention.

A third alternative embodiment of the present invention, shown in FIG. 12, includes the addition of the paper guide 26 of the first alternative embodiment and the decorative tab 32 of the second alternative embodiment. In that embodiment, the paper guide 26 is used to align the end of tape 12 and the beginning of decorative tab 32 with the edge of the top sheet of paper 22, so that the full length of the decorative tab 32 and none of tape 12 projects from sheet 22.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A packaging system for double-faced adhesive tape, comprising:
    means for covering both adhesive faces of the tape said covering means including a non-stick coating and comprising a strip of material folded in a W-shape to form a pocket for receiving the double-faced adhesive tape; and
    means connected to the covering means for removing said covering means from both faces of the tape simultaneously.

2. The wrapper according to claim 1, wherein the removing means comprises a tab connected to the strip of material.

3. An adhesive device, comprising:
    covering means folded to form a pocket;
    a piece of double-faced adhesive tape having adhesive on both sides thereof disposed within said pocket;
    means for holding the piece of tape connected to one end of the piece of tape thereof and projecting from the pocket; and
    means connected to the covering means for removing the covering means from the piece of tape.

4. The adhesive device according to claim 3, wherein the pocket is closed on one side and open on three sides.

5. The adhesive device according to claim 4, wherein the holding means projects from the open side of the pocket opposite the closed side.

6. The adhesive device according to claim 5, further comprising guide means attached to the covering means for indicating the length of the piece of tape.

7. The adhesive device according to claim 5, further comprising a decorative tab connected to a second end of the piece of tape.

8. The adhesive device according to claim 3, wherein the covering means comprises a strip of material folded in a W-shape to form a pocket for receiving the piece of double-faced adhesive tape.

9. A method of using a piece of double-faced adhesive tape packaged in a wrapper, comprising the steps of:
    positioning the piece of tape and its wrapper between two pieces of material;
    retaining a holding means connected to the piece of tape;
    removing the wrapper from the piece of tape by pulling a pulling means connected to the wrapper; and
    applying the pressure to the pieces of material and the piece of tape to enhance the adhesion between the material and tape.

10. The method according to claim 9, wherein the piece of tape and wrapper are positioned between the two pieces of material such that the pulling means projects from between the two pieces of material.

11. The method according to claim 10, wherein the piece of tape and its wrapper are positioned between the two pieces of material by aligning a guide means with one of the pieces of material.

12. The method according to claim 10, wherein the piece of tape is positioned between the two pieces of material such that a decorative tab affixed to the piece of tape is exposed when the wrapper is removed.

* * * * *